US011995652B2

(12) United States Patent
Spence et al.

(10) Patent No.: US 11,995,652 B2
(45) Date of Patent: May 28, 2024

(54) DATA PROCESSING APPARATUS AND METHODS

(71) Applicant: VOCALINK LIMITED, London (GB)

(72) Inventors: Liam Spence, York (GB); Gareth James Tupper, Buckinghamshire (GB); Jason Roseaman, Cambridgeshire (GB); Vasanthan Anandasingam, Essex (GB); Martin Hargreaves, Buckinghamshire (GB); Andrew Barnes, Leeds (GB)

(73) Assignee: VOCALINK LIMITED, London (GB)

( * ) Notice: Subject to any disclaimer, the term of this patent is extended or adjusted under 35 U.S.C. 154(b) by 209 days.

(21) Appl. No.: 16/455,138

(22) Filed: Jun. 27, 2019

(65) Prior Publication Data

US 2020/0005291 A1 Jan. 2, 2020

(30) Foreign Application Priority Data

Jun. 28, 2018 (EP) .................................... 18180591

(51) Int. Cl.
*G06Q 20/40* (2012.01)
*G06F 16/9035* (2019.01)
(Continued)

(52) U.S. Cl.
CPC ....... *G06Q 20/401* (2013.01); *G06F 16/9035* (2019.01); *G06Q 20/027* (2013.01);
(Continued)

(58) Field of Classification Search
CPC ............. G06Q 20/3821; G06Q 20/027; G06Q 20/0855; G06Q 20/363; G06Q 20/409;
(Continued)

(56) References Cited

U.S. PATENT DOCUMENTS

| 6,189,785 B1 * | 2/2001 | Lowery | G06Q 20/042 |
| | | | 705/45 |
| 6,516,324 B1 * | 2/2003 | Jones | G16H 30/20 |
| | | | 707/999.102 |

(Continued)

FOREIGN PATENT DOCUMENTS

| WO | WO-2017160441 A1 * | 2/2017 | ............. G06Q 20/40 |
| WO | 2017160441 A1 | 9/2017 | |

OTHER PUBLICATIONS

European Extended Search Report, Application No. 18180591.2, dated Oct. 17, 2018, 10 pps.

*Primary Examiner* — Steven S Kim
(74) *Attorney, Agent, or Firm* — Armstrong Teasdale LLP

(57) ABSTRACT

A data processing apparatus including communication circuitry configured to receive data indicative of a user and data indicative of an instruction associated with the user, and control circuitry configured to determine whether the received data indicative of the user and data indicative of the instruction associated with the user have been generated in the absence of an explicit command from the user using previously obtained data indicative of the user and data indicative of an instruction associated with the user, to determine whether the received data indicative of the user and data indicative of the instruction associated with the user include a predetermined characteristic, to execute processing to reject the instruction associated with the user as indicated by the received data, and to execute processing to accept the instruction associated with the user as indicated by the received data.

18 Claims, 14 Drawing Sheets

(51) Int. Cl.
*G06Q 20/02* (2012.01)
*G06Q 20/08* (2012.01)
*G06Q 20/36* (2012.01)
*G06Q 20/38* (2012.01)

(52) U.S. Cl.
CPC ....... *G06Q 20/0855* (2013.01); *G06Q 20/363* (2013.01); *G06Q 20/3821* (2013.01); *G06Q 20/409* (2013.01)

(58) Field of Classification Search
CPC . G06Q 20/405; G06Q 20/401; G06F 16/9035
See application file for complete search history.

(56) References Cited

U.S. PATENT DOCUMENTS

| | | | | |
|---|---|---|---|---|
| 7,567,934 | B2* | 7/2009 | Flitcroft | G06Q 20/24 705/37 |
| 8,127,982 | B1* | 3/2012 | Casey | G06Q 40/02 235/382.5 |
| 10,552,917 | B1* | 2/2020 | Kunz | G06Q 40/12 |
| 2003/0042301 | A1* | 3/2003 | Rajasekaran | G06Q 20/02 235/380 |
| 2004/0122756 | A1* | 6/2004 | Creeden | G06Q 40/08 705/35 |
| 2009/0171839 | A1* | 7/2009 | Rosano | G06Q 20/12 705/40 |
| 2010/0057623 | A1* | 3/2010 | Kapur | G06Q 20/3224 705/72 |
| 2010/0145810 | A1* | 6/2010 | Pourfallah | G06Q 20/327 705/17 |
| 2010/0299230 | A1* | 11/2010 | Patterson | G06Q 20/405 705/30 |
| 2012/0011066 | A1* | 1/2012 | Telle | G06Q 20/425 705/44 |
| 2012/0101930 | A1* | 4/2012 | Li | G06Q 40/02 705/35 |
| 2012/0215696 | A1* | 4/2012 | Salonen | G06Q 40/00 705/44 |
| 2012/0232981 | A1* | 9/2012 | Torossian | G06Q 20/326 705/26.1 |
| 2012/0259752 | A1* | 10/2012 | Agee | G06Q 40/00 705/35 |
| 2014/0032409 | A1* | 1/2014 | Rosano | G06Q 20/40 |
| 2014/0114832 | A1* | 4/2014 | Escott | G06Q 40/04 705/37 |
| 2015/0278189 | A1* | 10/2015 | Booth | G06F 40/284 704/9 |
| 2016/0171479 | A1* | 6/2016 | Prakash | G01D 4/004 705/44 |
| 2017/0116585 | A1 | 4/2017 | Rosano | |
| 2017/0140377 | A1* | 5/2017 | Rechert | G06Q 20/023 |
| 2017/0148020 | A1* | 5/2017 | Vienravee | G06Q 20/401 |
| 2017/0270604 | A1* | 9/2017 | Abela | G06Q 40/025 |
| 2018/0082272 | A1* | 3/2018 | Hilleary et al. | G06Q 20/20 |
| 2019/0095915 | A1* | 3/2019 | Gjondrekaj | G06Q 20/405 |

* cited by examiner

Restrictions Database

| Cardholder ID | Merchant | Time Period Constraint | Payment Amount Constraint |
|---|---|---|---|
| 1234 5678 9012 3456 (Issuer 1) | Merchant 1 (Acquirer 1) | Not before 1 October 2018 | Not more than £500 |
| 2345 6789 0123 4567 (Issuer 2) | Merchant 1 (Acquirer 1) | N/A | N/A |
| 3456 7890 1234 5678 (Issuer 2) | Merchant 2 (Acquirer 1) | Not before 1 June 2018 @ 13:00 | N/A |
| 1234 5678 9012 3456 (Issuer 1) | Merchant 3 (Acquirer 2) | N/A | N/A |
| 4567 8901 2345 6789 (Issuer 1) | Merchant 4 (Acquirer 1) | Not before 1 Jan 2018 @ 0:00 | Not more than £250 |
| 5678 9012 3456 7890 (Issuer 1) | Merchant 5 (Acquirer 2) | N/A | Not more than £350 |

300 — Cardholder ID; 301 — Merchant; 302 — Time Period Constraint; 303 — Payment Amount Constraint

Issuer

| Cardholder ID | Merchant | Time Period Constraint | Payment Amount Constraint | Edit? |
|---|---|---|---|---|
| 1234 5678 9012 3456 | Merchant 1 | Not before 1 October 2018 | Not more than £500 | Edit |
| * | Merchant 3 | N/A | N/A | Edit |
| 4567 8901 2345 6789 | Merchant 4 | Not before 1 Jan 2018 @ 0:00 | Not more than £250 | Edit |
| 5678 9012 3456 7890 | Merchant 5 | N/A | Not more than £350 | Edit |

Customer:
Mr John Smith
123 Fake Street
Londinium
L01 2ZZ — 306

| Cardholder ID | Merchant | Time Period Constraint | Payment Amount Constraint | Edit? |
|---|---|---|---|---|
| Credit Card 1234 5678 9012 3456 | Merchant 1 | Not before 1 October 2018 | Not more than £500 | Edit |
| " | Merchant 3 | N/A | N/A | Edit |
| Debit Card 5678 9012 3456 7890 | Merchant 5 | N/A | Not more than £350 | Edit |

| Cardholder ID | Merchant | Time Period Constraint | Payment Amount Constraint |
|---|---|---|---|
| 1234 5678 9012 3456 | Merchant 1 | Not before 1 October 2018 | Not more than £500 |
| 2345 6789 0123 4567 | Merchant 1 | N/A | N/A |
| 3456 7890 1234 5678 | Merchant 2 | Not before 1 June 2018 @ 13:00 | N/A |
| 4567 8901 2345 6789 | Merchant 4 | Not before 1 Jan 2018 @ 0:00 | Not more than £250 |

300 — Cardholder ID
301 — Merchant
302 — Time Period Constraint
303 — Payment Amount Constraint

A, B, C, E

Acquirer

FIG. 3E

Merchant

| Cardholder ID | Time Period Constraint | Payment Amount Constraint |
|---|---|---|
| A   1234 5678 9012 3456 | Not before 1 October 2018 | Not more than £500 |
| B   2345 6789 0123 4567 | N/A | N/A |

300 — Cardholder ID
302 — Time Period Constraint
303 — Payment Amount Constraint

FIG. 3F

Transaction Database

| | Cardholder ID | Merchant | Transaction Date/Time | Transaction Amount | Approved/Declined |
|---|---|---|---|---|---|
| A' | 1234 5678 9012 3456 (Issuer 1) | Merchant 1 (Acquirer 1) | 17 September 2017 13:14 | £398.35 | Declined |
| B' | 2345 6789 0123 4567 (Issuer 2) | Merchant 1 (Acquirer 1) | 18 March 2018 21:02 | £201.50 | Declined |
| C' | 3456 7890 1234 5678 (Issuer 2) | Merchant 2 (Acquirer 1) | 29 May 2018 13:50 | £189.00 | Declined |
| D' | 1234 5678 9012 3456 (Issuer 1) | Merchant 3 (Acquirer 2) | 16 September 2017 22:01 | £322.60 | Declined |
| E' | 4567 8901 2345 6789 (Issuer 1) | Merchant 4 (Acquirer 1) | 8 January 2018 11:20 | £198.65 | Approved |
| F' | 5678 9012 3456 7890 (Issuer 1) | Merchant 5 (Acquirer 2) | 7 July 2017 12:46 | £371.18 | Declined |

FIG. 4A

Issuer

| Cardholder ID | Merchant | Transaction Date/Time | Transaction Amount | Approved/Declined | Details? |
|---|---|---|---|---|---|
| 1234 5678 9012 3456 | Merchant 1 | 17 September 2017 13:14 | £398.35 | Declined | Details |
| 1234 5678 9012 3456 | Merchant 3 | 16 September 2017 22:01 | £322.60 | Declined | Details |
| 4567 8901 2345 6789 | Merchant 4 | 8 January 2018 11:20 | £198.65 | Approved | Details |
| 5678 9012 3456 7890 | Merchant 5 | 7 July 2017 12:46 | £371.18 | Declined | Details |

FIG. 4B

Customer:
Mr John Smith — 306
123 Fake Street
Londinium
L01 2ZZ

| Cardholder ID | Merchant | Transaction Date/Time | Transaction Amount | Approved/Declined | Details? |
|---|---|---|---|---|---|
| Credit Card 1234 5678 9012 3456 | Merchant 1 | 17 September 2017 13:14 | £398.35 | Declined | Details |
| | Merchant 3 | 16 September 2017 22:01 | £322.60 | Declined | Details |
| Debit Card 5678 9012 3456 7890 | Merchant 5 | 7 July 2017 12:46 | £371.18 | Declined | Details |

FIG. 4C

Acquirer

| Cardholder ID | Merchant | Transaction Date/Time | Transaction Amount | Approved/Declined | Details? |
|---|---|---|---|---|---|
| 1234 5678 9012 3456 | Merchant 1 | 17 September 2017 13:14 | £398.35 | Declined | Details |
| 2345 6789 0123 4567 | Merchant 1 | 18 March 2018 21:02 | £201.50 | Declined | Details |
| 3456 7890 1234 5678 | Merchant 2 | 29 May 2018 13:50 | £189.00 | Approved | Details |
| 4567 8901 2345 6789 | Merchant 4 | 8 January 2018 11:20 | £198.65 | Approved | Details |

FIG. 4D

Merchant

| Cardholder ID | Transaction Date/Time | Transaction Amount | Approved/Declined | Details? |
|---|---|---|---|---|
| 1234 5678 9012 3456 | 17 September 2017 13:14 | £398.35 | Declined | Details |
| 2345 6789 0123 4567 | 18 March 2018 21:02 | £201.50 | Declined | Details |

FIG. 4E

DATA PROCESSING APPARATUS AND METHODS

CROSS REFERENCE TO RELATED APPLICATIONS

This patent application claims priority to European Patent Application No. 18180591.2 filed on Jun. 28, 2018, the disclosure of which is incorporated by reference herein in its entirety as part of the present application.

BACKGROUND

The present disclosure relates to a data processing apparatus and methods.

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

Modern data processing apparatuses allow users to provide a large number of instructions in the form of electronic messages so as to allow such data processing apparatuses to perform a wide variety of functions. It is often the case, however, that a user may be required to transmit the same instruction to a data processing apparatus on more than one occasion. It is therefore known to save information associated with certain instructions provided by the user so as to allow repeated instructions to be processed by the data processing apparatus without the user having to manually issue the instruction a second or more times.

Such an arrangement improves the convenience for the user and allows processes requiring instructions from a user to be conducted more efficiently. A problem, however, is that it is often difficult for the user to keep track of which instructions have been previously carried out and which may thus be carried out a second or more times without requiring further input from them. This is particularly the case when the data processing apparatus concerned processes lots of different instructions provided on behalf of the user by different services, third parties or the like. There is therefore a need for a user to be able to more easily and efficiently determine instructions which have been stored for use by the data processing apparatus a second or more times.

BRIEF DESCRIPTION

The present technique is defined by the claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3A to 3F provide an example of information that can be stored in the first storage medium as part of the first database, according to an embodiment;

FIGS. 4A to 4E provide an example of information that can be stored in the second storage medium as part of the second database, according to an embodiment.

DETAILED DESCRIPTION

Figure 1:
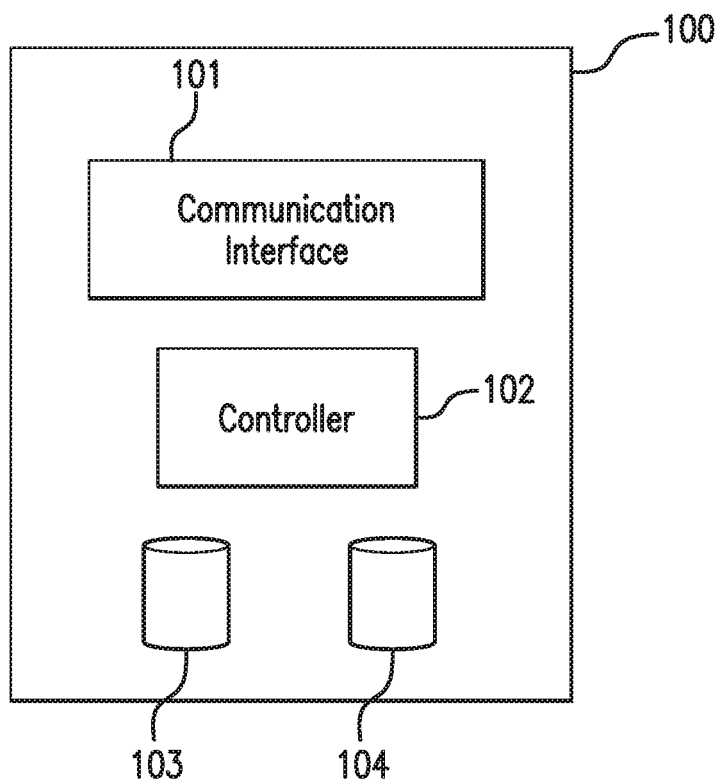
FIG. 1 schematically shows a data processing apparatus according to an embodiment.

Referring now to the drawings, wherein like reference numerals designate identical or corresponding parts throughout the several views.

FIG. 1 shows a data processing apparatus according to an embodiment of the present technique.

The data processing apparatus 100 includes a communication interface 101, a controller 102, and first and second storage mediums 103 and 104. The communication interface 101 and controller 102 may be implemented as circuitry, for example. The operation of the communication interface 101, storage medium 103 and storage medium 104 is controlled by the controller 102. The controller 102 also generally controls the data processing apparatus 100 to operate in accordance with the present technique. The first and second storage mediums 103 and 104 may each be any suitable storage medium for storing digital data, such as a hard disk drive, solid state drive, tape drive, or the like.

The communication interface 101 is configured to receive data indicative of a user and data indicative of an instruction associated with the user. The controller 102 is configured to determine whether the received data indicative of the user and data indicative of the instruction associated with the user have been generated in the absence of an explicit command from the user using previously obtained data indicative of the user and data indicative of an instruction associated with the user. If it is determined that the received data indicative of the user and data indicative of the instruction associated with the user have been generated in the absence of an explicit command from the user using previously obtained data indicative of the user and data indicative of an instruction associated with the user, the controller 102 determines whether the received data indicative of the user and data indicative of the instruction associated with the user include a predetermined characteristic. If the received data indicative of the user and data indicative of the instruction associated with the user include the predetermined characteristic, then the controller 102 executes processing to reject the instruction associated with the user as indicated by the received data. On the other hand, if the received data indicative of the user and data indicative of the instruction associated with the user do not include the predetermined characteristic, then the controller 102 executes processing to accept the instruction associated with the user as indicated by the received data.

Figure 2:
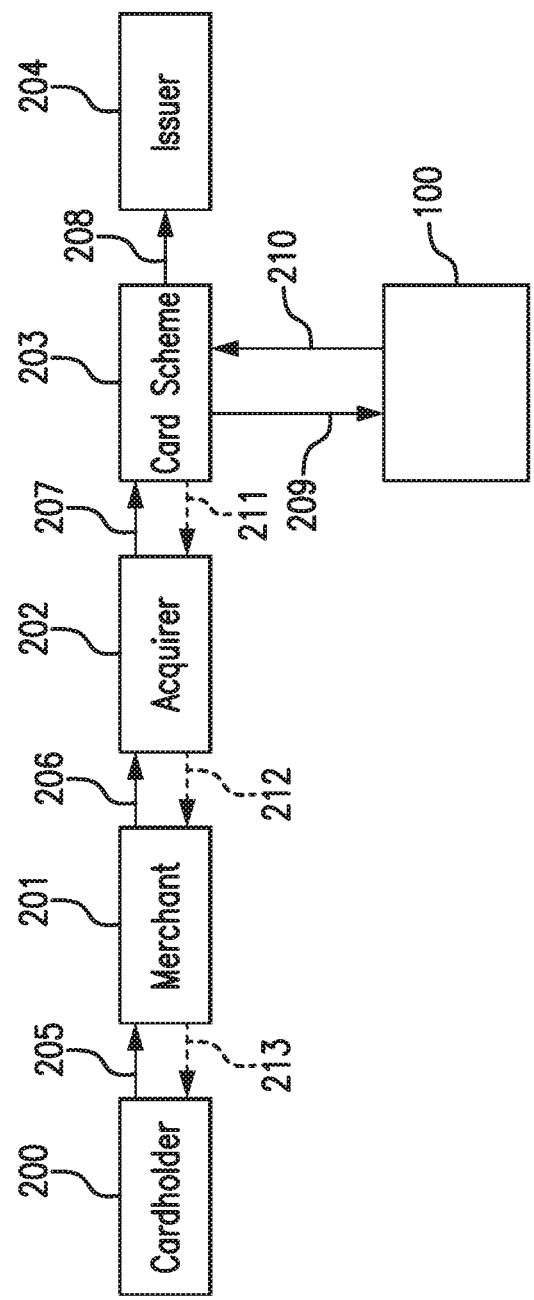
FIG. 2 schematically shows an example application of the present technique according to an embodiment.

FIG. 2 shows an example application of the present technique. In this application, the received data indicative of a user includes electronic payment card details of a user (for example, details of a credit, debit, or charge card held by the user) and the data indicative of an instruction associated with the user is an instruction to process a payment using the user's electronic payment card. In such scenarios, it is common for details of a user's electronic payment card to be retained by a merchant so as to enable, for example, a service to be continually provided to the user. For example, a user may choose to pay for utility bills, insurance or the like using an electronic payment card and, in order to reduce the risk of the user not paying for such services when payment becomes due (such services usually require payments to be made by the user on a recurring basis), the merchant (e.g., utility provider, insurance provider, or the like) retains the user's electronic payment card details so as to allow payments to be taken from the user automatically when required.

Such an arrangement provides convenience to the user and reduces the risk of them forgetting to make a payment (which could result in, for example the user defaulting on a payment). However, there is no convenient way for a user to check which merchants might have details of their electronic payment card stored and therefore which merchants are liable to charge them for services. This can cause problems if, for example, a user decides to stop using a particular service or to change supplier but does not explicitly inform the merchant concerned that that is what they wish to do. In this case, the user's electronic payment card details will still be with the merchant and the electronic payment card may still be charged despite the user not wanting to continue with the service and therefore not wanting to continue with payments using the electronic payment card.

Currently, it is only possible for a user to know whether or not a particular merchant has their electronic payment card details on file and is authorized to charge the electronic payment card without an explicit instruction from the user to do so by contacting the merchant directly and asking them. Nowadays, when users are presented with a large range of available services which may be paid for at regular intervals using an electronic payment card, the need to do this is time consuming and cumbersome for the user. An improved way of allowing a user to review the merchants who are authorized to make payments using an electronic payment card without explicit instructions from the user to do so and which allows a user to be given more control over such automated payments is therefore desirable. It is noted that such automatic payments to particular merchants using an electronic payment card may be referred to as continuous payment authorities (CPAs).

To help give some context to the present technique, FIG. 2 shows a schematic diagram illustrating the way in which a card payment is made. Firstly, the cardholder 200 presents the electronic payment card to a merchant 201 when purchasing a good or service. The card may be presented physically (using a contactless or chip and pin interface, for example) or may be presented remotely (e.g., over the phone or using an online payment system). When the cardholder 200 presents the payment card to the merchant 201, certain details of the payment card are provided to the merchant at step 205. The details may include, for example, the PAN number of the card and its expiry date. The details provided are details sufficient for an electronic payment to be made using the electronic payment card. At step 206, the merchant then transmits transaction data to an acquirer 202 of the electronic payment card. The transaction data includes information such as details of the payment card necessary for transferring funds from the cardholder 200 to the merchant 201 and data indicative of the amount of the transaction in a given currency. The acquirer 202 and merchant 201 will generally have a service contract in place in which the acquirer agrees to process electronic card payments for the merchant in exchange for a fee. At step 207, a transaction authorization request is transmitted from the acquirer 202 to a card scheme 203. Such card schemes are provided by parties such as MasterCard®, for example. At step 208, the card scheme routes the transaction authorization request to a card issuer 204 of the payment card concerned. The issuer 204 will typically be a financial institution such as a bank at which the cardholder holds an account. The electronic payment card of the cardholder 200 is issued to the cardholder 200 by the issuer 204. Once the transaction authorization request has been transferred to the issuer 204, the issuer 204 will accept or decline the payment. Assuming that the payment authorization request is accepted, the payment processing may then be completed. This results in a transfer of funds from the account of the cardholder 200 at the issuer 204 to an account of the merchant 201 managed by the acquirer 202. The detailed mechanism behind card payments is already known and will therefore not be discussed in detail here. Thus, other flows of data between the cardholder 200, merchant 201, acquirer 202, card scheme 203, and issuer 204 are omitted in this description for the sake of brevity.

As previously discussed, in order to provide improved convenience for the user and to help prevent the user from accidentally defaulting on a payment for a continually provided service, the merchant 201 may store details of an electronic payment card held by the user so as to allow them to periodically charge the user's payment card for that service. This will have been agreed with the cardholder in advance. Such recurring payments are known as CPAs (as previously discussed) and may be flagged to the card scheme 203 by the merchant 201 including data indicating that a particular instructed card payment is a CPA payment when transmitting transaction data to the acquirer (that is, data indicative that the payment is a CPA payment is included in the transaction data, for example). Data indicating that the instructed payment is a CPA payment is also included in the transaction authorization request transmitted from the acquirer 202 to the card scheme 203.

As mentioned above, a user is currently only able to find out about CPA payments associated with a particular payment card by contacting each of the merchants holding records of the details of that payment card. It is therefore time-consuming and cumbersome for a user to find out about active CPAs for a particular payment card.

In an embodiment, the present technique helps to alleviate this problem by allowing CPA payments to be checked against a set of parameters determined by a user in advance. A user is thus given central control over CPA payments for a particular payment card and is able to stop or change a characteristic (such as a maximum charge amount or time at which a payment can be taken) using a centralized process.

In an embodiment, such a centralized CPA service is provided by adding the data processing apparatus 100 to the payment card process shown in FIG. 2. In particular, the data processing apparatus 100 may be implemented at the card scheme 203 stage of the payment process, as illustrated in FIG. 2.

It is noted that, although not shown, the process implemented by each of the merchant 201, acquirer 202, card scheme 203, issuer 204 and, in the case of payments when the cardholder is not physically present at a premises of the merchant (e.g., when the cardholder makes a transaction over the internet) is actually implemented by a data processing apparatus accessible to each of these parties. Such data processing apparatuses will include communication circuitry and processing circuitry so as to enable electronic messages to be processed and transmitted to other data processing apparatuses (e.g., the electronic messages transmitted at steps 205, 206, 207, 209, 210, 208, 211, 212, and 213 may be transmitted using such communication circuitry). In an embodiment, the data processing apparatus 100 is a data processing apparatus which, in addition to the functions of the present technique as described, also performs the other conventional functions of the card scheme 203.

With the arrangement of FIG. 2, two extra steps 209 and 210 are implemented between step 207 (at which a transaction authorization request is transmitted from an acquirer 202 to the card scheme 203) and the step 208 (in which the transaction authorization requested is routed from the card scheme 203 to the issuer 204).

At step 209, data received as part of the transaction authorization request is passed to the data processing apparatus 100. It is at the data processing apparatus 100 that it is determined whether the received data indicative of the user (e.g., the payment card details) and the data indicative of the instruction associated with the user (e.g., the instruction to pay a certain amount of money using the payment card) have been generated in the absence of an explicit command from the user using previously obtained data indicative of the user and data indicative of an instruction associated with the user. In this case, when an instructed payment is a CPA payment, the card payment data and data indicating the transaction and transaction amount will have been generated on the basis of payment details stored with the merchant so as to allow a card payment to be initiated without the user having to again present their card details to the merchant. In this example, it is determined that the received data indicative of the user and data indicative of the instruction associated with the user have been generated in the absence of an explicit command from the user using previously obtained data indicative of the user and data indicative of an instruction associated with the user when the received data at step 209 includes a predetermined indicator that the payment is a CPA payment. The predetermined indicator may be, for example, a flag indicating that the payment instructed by the message received at step 209 is a CPA payment. For the sake of clarity, at step 209, the message received by the data processing apparatus 100 is an electronic message comprising, as data indicative of the user, details of an electronic payment card held by the user and, as an instruction associated with the user, an instruction for a payment of an identified amount to be made to an identified merchant using the details of the electronic payment card held by the user. In an embodiment, the electronic message transmitted to the data processing apparatus at step 209 is a transaction authorization request (as transmitted from the acquirer 202 to the card scheme 203 at step 207) which may or may not include a CPA flag indicating that the instructed payment is a CPA payment.

If it is determined that the received data indicative of the user and data indicative of an instruction associated with the user have been generated in the absence of an explicit command from the user using previously obtained data indicative of the user and data indicative of an instruction associated with the user, the controller 102 of the data processing apparatus 100 determines whether the received data indicative of the user and data indicative of an instruction associated with the user include a predetermined characteristic.

In the case of the received data indicative of the user and data indicative of an instruction associated with the user being a transaction authorization request for a payment card transaction, the predetermined characteristic is that the instructed payment has a predetermined one or more of predetermined payment attributes stored in a first database relating data indicative of the user (e.g., payment card details of a payment card held by that user) and data indicative of one or more payment attributes.

The first database is stored in the first storage medium 103. In an embodiment, the one or more payment attributes include one or more of data identifying a merchant, data identifying a constraint on an amount payable to that merchant, and data identifying a constraint on a time period during which a payment to that merchant may be made. That is, the first database stored in the first storage medium 103 includes data with which the latest instructed CPA payment is compared so as to determine whether the latest instructed payment and data stored in the first database share a predetermined one or more of certain attributes. As will be explained, the attributes stored in the first database are accessible to one or more parties (including the merchant 201, acquirer 202, and/or issuer 204). In the case that the received data indicative of the user and data indicative of the instruction associated with the user include the predetermined characteristic (in this case, that the instructed payment has a predetermined one or more of the payment attributes), the controller 102 executes processing to reject the payment instruction. On the other hand, if the instructed payment does not have a predetermined one or more of the payment attributes stored in the first database, then the controller 102 executes processing to accept the instruction associated with the user as indicated by the received data.

It will thus be appreciated that the first storage medium 103 includes data indicating one or more attributes of a particular CPA payment which are not acceptable to the cardholder. In the case that an issued CPA payment has a predetermined one or more of these attributes, the payment is rejected. More details on this are provided later on.

After the controller 102 of the data processing apparatus 100 has accepted or rejected the payment instruction, data indicative of the acceptation or rejection is transmitted back to the card scheme 203 (that is, back to a data processing apparatus (not shown) implementing the conventional card scheme processing) at step 210. In the case that the payment instruction is accepted, the card scheme then routes the transaction authorization request to the issuer 204 at step 208 in the usual way. On the other hand, if the decision is to reject the payment instruction, then data indicative of this is transmitted back to the acquirer (at step 211). The acquirer 202 then transmits data indicating that the payment instruction has been rejected to the merchant at step 212. The merchant is thus aware that the CPA payment instruction has been rejected. The merchant 201 may therefore contact the cardholder 200 at step 213 in order to inquire as to why the payment was rejected. The merchant and cardholder may then discuss the specific situation at hand.

For example, if the CPA payment was for an insurance product, then the CPA instruction may have been rejected because the user had previously specified (by accessing the first database, as will be explained) that an insurance premium payment of more than a certain amount should be rejected as a CPA payment. The cardholder may therefore be able to negotiate a better insurance premium price with the merchant. As another example, the CPA payment may have been for a gym contract which the cardholder no longer has a need for because they have moved to a different city. The cardholder may therefore have set, as a payment attribute recorded in the first database for CPA payments to the merchant (gym provider), that payments after a certain date (e.g., the date at which the cardholder moves away) should no longer be accepted. Again, in this case, the merchant may negotiate with the cardholder to sign them up at a gym in the user's new location, perhaps with a discount or the like. It will be appreciated that these are only examples, and that the centralized control of CPA payments enabled by the present technique allows, more generally, for a user to have better control over recurring electronic instructions such as CPA payment instructions in an easy and secure way.

As previously mentioned, a record of the first database relating data indicative of the user (e.g., payment card details) and data indicative of one or more payment attributes may be accessible to one or more of an issuer 204 of the electronic payment card held by the user, a merchant 201 identified by the data indicative of one or more payment attributes, and an electronic payment card acquirer 202 associated with a merchant 201 identified by the data indicative of one or more payment attributes.

In one example, the issuer of the payment card is able to view all records in the first database relating to a payment card issued by that issuer. The issuer may then make this information available to the cardholder via the cardholder's usual online banking portal or the like (it is recalled that the cardholder 200 will have an account with the issuer 204 in order to have obtained the payment card from the issuer in the first place).

In an embodiment, a merchant 201 may be able to obtain records from the first database for payment card data of payment cards used to register CPA payments with the merchant in the first place. Thus, a merchant will be able to see the payment attributes associated with each payment card registered with that merchant as being available for use in instructing CPA payments. A merchant is therefore able to review, for example, why a particular CPA payment was rejected (for example, the CPA payment may have exceeded a maximum price set by the user or may have been instructed after the expiry of a time period for the CPA payment set by the user, as previously discussed) and is therefore provided with improved visibility of what is and what is not acceptable to customers when it comes to CPA payments. In an embodiment, an acquirer 202 may be able to access records of the first database for payment card data registered as being available for use for CPA payments to merchants who use that particular acquirer. Again, this allows the acquirer to monitor the payment attributes associated with CPA payments and to provide better visibility to the acquirer of cardholder habits and preferences relating to CPA payments.

As well as the first database which, in this example, records CPA payment attribute data for each payment card held by a user who has signed up for use of the CPA service provided by the data processing apparatus 100, the second storage medium 104 includes a second database relating data indicative of each instructed payment (that is, each CPA payment instruction) and data indicative of whether that instructed payment was accepted or rejected. Thus, after the controller 102 has compared an incoming CPA payment with the payment attributes stored in the first database and has thus decided whether or not to accept the instructed CPA payment, the result of the instructed CPA payment is recorded (by the controller 102) in the second storage medium 104 as part of a second database. Again, this provides a useful record to one or more of the merchant 201, acquirer 202, and issuer 204 regarding CPA payments which were instructed and, subsequently, either accepted or rejected based on the CPA payment attribute data stored in the first database. Again, a record of the second database relating data indicative of an instructed payment and data indicative of whether that instructed payment was accepted or rejected is thus accessible to one or more of an issuer of the electronic payment card used for instructing the payment, the identified merchant of the instructed payment, and an electronic payment card acquirer of the identified merchant of the instructed payment. In a similar fashion to that described with reference to the first database, an issuer may again be able to see the instructed CPA payments and the result of each of those payments for all payment cards issued by that issuer. A merchant, on the other hand, will only be able to see CPA payments instructed by that merchant. Similarly, an acquirer will only be able to see CPA payments (and the result) for CPA payments instructed by merchants contracted to use that particular acquirer. Some specific examples of this are provided later on.

It should thus be clear how the present technique is implemented at a broad level, in particular, in the context of electronic card payments. In embodiments, as has been explained, the communication interface 101 is configured to receive, via the card scheme 203, the data indicative of the user (e.g., details of a payment card held by the user) and the data indicative of the instructed payment (e.g., a transaction authorization request for a CPA payment) from an electronic payment card acquirer associated with the merchant identified by the instructed payment (e.g., the identified merchant in the transaction authorization request). The processing carried out by the controller 102 to reject the payment instruction includes controlling the communication interface 101 to transmit, via the card scheme 203, an electronic message back to the electronic payment card acquirer associated with the identified merchant of the instructed payment indicating that the instructed payment has been rejected. On the other hand, the processing to accept the payment instruction includes processing the payment instruction in the usual way to complete the transaction. This occurs in response to the controller 102 controlling the communication interface 101 to transmit an electronic message back to the card scheme 203 indicating that the instructed payment has been accepted. The processing of the payment instruction to complete the transaction includes routing the transaction authorization request to the issuer 204 at step 208 and allowing the usual electronic payment card processing to be completed. For the sake of brevity, the remaining electronic payment card processing is conventional and has therefore not been described in detail in the present application.

Some specific examples of how the present technique might be implemented in embodiments is now described.

FIGS. 3A-3F provide an example of information that can be stored in the first storage medium 103 as part of the first database. As data indicative of the user, each record in the first database includes a cardholder ID 300. In this case, the cardholder ID is the 16 digit primary account number (PAN) of the payment card registered with the CPA service. It is noted that each of the records of the first database may be created the first time the payment card associated with that record is used for instructing a CPA payment. In this case for example, when the controller 102 of the data processing apparatus 100 detects that an incoming payment instruction includes a CPA flag and that the cardholder ID (or cardholder ID and merchant ID combination) is not present in the first database, the controller 102 creates a new record for that cardholder ID (or cardholder ID and merchant ID combination) with a number of default payment attributes. The default payment attributes may be chosen that such that, unless edited by the user (using an online banking portal or the like provided by the issuer, as discussed above), all subsequent CPA payment instructions will be processed. This may be achieved by, for example, setting attributes such as a time period constraint or payment amount constraint to be, respectively a "not before" time which has already passed and a "maximum" payment amount which exceeds a maximum payment limit of the payment card concerned. Such an arrangement means that, although the payment card used for instructing the CPA payment is now identified in the database together with a number of payment attributes, CPA payments are not rejected unless the user specifically changes the payment attributes accordingly (e.g., by changing the time period constraint and/or payment amount constraint).

It is noted that, in the embodiment of FIG. 3A, each new record in the first database includes both a cardholder ID 300 (in the form of the 16 digit PAN number of the payment card concerned, together with any other necessary information such as the card expiry date necessary for completing payments using that payment card) and a merchant identifier 301 (merchant ID) which uniquely identifies the merchant instructing the CPA payment. It is therefore possible for a single payment card to have multiple records in the first database, each record being associated with a different merchant (and therefore merchant identifier). In the example of FIG. 3A, it can be seen that the same cardholder ID labelled A and labelled D has two separate records in the first database, one in association with a first merchant (with merchant ID "Merchant 1") and another being associated with another merchant (with merchant ID "Merchant 3"). Thus, with the example of FIG. 3A, each time a CPA instruction is issued for the first time for a particular merchant (for example, when a user first registers with a service which uses CPA payments and makes a first payment for that service to that merchant using a particular payment card), the cardholder ID and merchant ID are stored as a record in the first database.

If no further attributes are defined (in this case, time period constraint 302 and payment amount constraint 303 are payment attributes which may be further defined, that is, optional payment attributes), as previously discussed, the optional payment attributes are set such that they will never be met by a second or subsequent CPA payment to the identified merchant using the identified payment card. This allows the default position to be that CPA payments are allowed, thus ensuring continuity of service for the user and helping to alleviate the risk of accidental payment default. On the other hand, the initial CPA payment may, for example, include data indicative of default values for the optional payment attributes as chosen by the user during the making of the initial payment. The optional attributes may then be adjusted by the cardholder accessing the first database via an online banking portal or the like provided to the cardholder 200 by the issuer 204.

In the example of FIG. 3A, it is seen that the first payment card has two records in the first database (denoted by letters A and D). The first record is associated with a merchant with merchant ID "Merchant 1" and has the defined time period constraint of "not before 1 Oct. 2018" and a payment amount constraint of "more than £500". That is, in this case, the payment attributes for the particular payment card include the merchant ID "Merchant 1", the time period constraint "not before 1 Oct. 2018" and the payment amount constraint "not more than £500". If an instructed CPA payment to Merchant 1 using the payment card details of A (or D) occurs before 1 Oct. 2018 or relates to a transaction amount of more than £500, the CPA payment is thus rejected.

The other record relating to the same payment card is denoted by the letter D and relates to a different merchant with merchant ID "Merchant 3". In this case, however, no time period constraint or payment amount constraint is defined. In this case, any CPA payment instructed by merchant 3 using the details of this payment card will therefore be rejected. Thus, in this embodiment, by not defining any payment attributes other than identifying the merchant, all CPA payments issued by that merchant using the payment card details of D (or A) will be rejected. On the other hand, if one or more other payment attributes are defined, then at least one of those attributes must be met by an instructed CPA payment in order for the CPA payment to be rejected. It will be appreciated that different payment attributes and combinations of payment attributes may be implemented with the present technique so as to provide a highly customizable set of options available to a cardholder 200 in order to control CPA payments.

A number of other records or the first database are shown in FIG. 3A, including four further cardholder IDs denoted by the letters B, C, E, and F. It is seen that each of the payment cards with which these details are respectively associated are issued by one of two different issuers, denoted "Issuer 1" and "Issuer 2". Similarly, the records relate to a number of different merchants (with merchant ID's "Merchant 1", "Merchant 2", "Merchant 3", "Merchant 4", and "Merchant 5"). Each of these merchants is, in turn, contracted to one of two different acquirers ("Acquire 1" or "Acquirer 2").

Different combinations of optional payment attributes are also shown in FIG. 3A.

Again, some of the records have no payment attributes defined for them other than the merchant ID. In this case, all CPA payments instructed by those merchants will be rejected. This is the case for the payment card of record B and the payment card of record D (as previously described).

The time period constraint of records C and E includes a time as well as a date. This is an option which is available to the user. If no time is specified, then the time period constraint will be applied from e.g., midnight (0:00) on that date. In the case of record C it is noted that a payment attribute has been defined for the time period constraint 302 but not for the payment amount constraint. Thus, before 1 Jun. 2018 at 13:00, any CPA instruction issued by Merchant 2 using the card details shown for record C will be rejected. However, after this date, any CPA payment instruction issued by Merchant 2 using these card details will be accepted, no matter how much the transaction amount is for (since no payment amount constraint has been defined). Conversely, for the record indicated by letter F, no time period constraint 302 has been defined. However, a payment amount constraint 303 has been defined. In this case, any CPA payment instructed by Merchant 5 using the card details shown in the record F will be accepted unless the transaction amount is for more than £350.

FIG. 3A thus demonstrates the flexibility provided by the present technique in determining various payment attributes for CPAs. It will be appreciated that the mentioned payment attributes are only examples, and that various other payment attributes may be used for the present technique. In addition, payment attributes may be mandatorily defined (for example, the merchant ID) or may be optionally defined (for example, the time period constraint 302 and payment amount constraint 303). It will be appreciated that the database may be tailored depending on the needs of merchants, cardholders, acquires, and issuers, as appropriate.

FIG. 3B shows a sub-set of the first database records made available to an issuer 204 of payment cards, the details of which may be stored for CPA payment management in the first database. In this case, the issuer is "Issuer 1". The records that are seen are therefore the records for payment cards issued by "Issuer 1". Thus, the records of FIG. 3A that are shown in FIG. 3B are the records denoted A, B, E, and F.

For each of the records, it can be seen that the payment attribute data for each record is shown in a similar way as before. The attribute information includes the merchant ID 301, time period constraint 302, and payment amount constraint 303. In this example, the list of records may be displayed on an electronic display of a computer operated by an employee at "Issuer 1". The display itself is not shown in FIG. 3B for the sake of clarity. However, the display of database records on an electronic display is known of the art, and it will thus be appreciated that the records shown in FIG. 3B may be displayed on an electronic display using a graphical user interface "GUI" or the like so as to enable a user (e.g., issuer employee) to easily view each record. In this case, the records shown in FIG. 3B may be displayed on an electronic display (not shown) in a similar way as shown in FIG. 3B (for example, in a tabular format). In this case, as shown, the table of records includes a further column 304 entitled "Edit?". For each record, a virtual button "Edit" 305 is provided. This button may be selected by a user using e.g., a touch panel of the electronic display or a mouse or the like for controlling an electronic curser. By selecting the "Edit" button 305 of an appropriate record, the values of the payment attributes (in particular, the optional payment attributes time period constraint 302 and payment amount constraint 303) may be amended.

FIG. 3C shows a further subset of the first database records shown in FIG. 3B. In this case, the records are the records available to a particular customer of the issuer 204 who has been issued one or more electronic payment cards by the issuer. In this case, the customer has been issued two cards by the issuer, a credit card (ending with digits 3456) and a debit card (ending with digits 7890). It is noted that the three records shown in FIG. 3C are also shown in FIG. 3B. However, FIG. 3C is generated by the issuer conducting a database query so as to view the database records for a single customer (based on a proprietary database relating payment card details and customer details held by the issuer, for example).

FIG. 3C shows an electronic screen which may be displayed to the customer (cardholder) whose records are shown using an electronic display or the like (not shown) used by the customer to access an online banking portal or the like provided by the issuer. Online banking portals and the like allow a customer of a financial institution such as a bank or credit card provider to use a device such as a personal computer, mobile phone, or tablet computer to access electronic data relating to accounts held by them at that financial institution. Such portals are known and will therefore not be described in detail. It is, however, noted that such portals will generally require credential information such as a username, password, or the like in order to allow a customer to access the portal.

As shown in FIG. 3C, the records are again displayed in a tabular format and show the cardholder ID 300, merchant ID 301, time period constraint 302, and payment amount constraint 303 for each record. It is noted that the displayed records relate to the records denoted A, D, and F shown in FIGS. 3A and 3B. Each of these records are related to the same customer. It is therefore noted that the details of multiple electronic payment cards may be associated with a single user. This is common, for example, when a user has both a credit card and a debit card with the same financial institution (issuer). It will nonetheless be appreciated, however, that the recorded details of each electronic payment card (which may include, for example, the PAN number of the card, the expiry date, and the like) are uniquely associated with the customer. The details of each payment card ("Cardholder ID") therefore remain as data indicative of the user (customer) even when that user may be associated with several instances of such data in a one-to-many relationship.

As shown in FIG. 3C, each of the records of the user concerned (A, D, and F) are displayed in a tabular format, together with data 306 providing some basic details of the user (thus allowing the user to confirm that the displayed records relate to them). Also, an additional "Edit?" column 404 is provided, with individually selectable "Edit" buttons 305 which are selectable by the user. A screen like that shown in FIG. 3C may be displayed to the user upon successfully logging in to an online account management portal (such as a banking portal) provided by the issuer, as previously discussed. The electronic screen shown in FIG. 3C would be displayed on an electronic display such as a personal computer, mobile phone, or tablet computer used by the user to access the online account management portal.

Figure 3D:
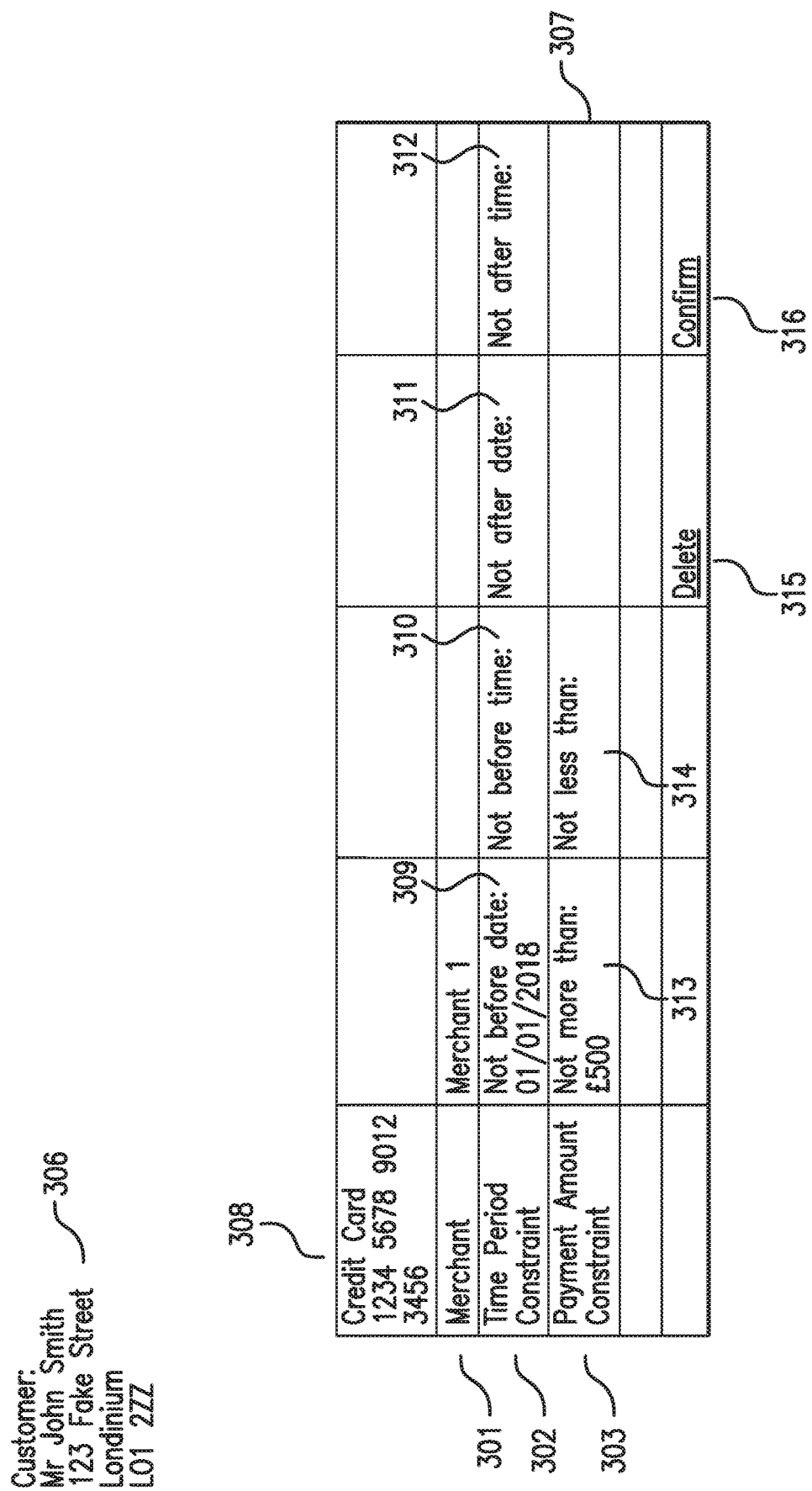

FIG. 3D shows an example electronic screen shown to the user after the record A is selected for editing by the user clicking the "Edit" button 305 associated with this record (as displayed in FIG. 3C). FIG. 3D is an electronic screen displayed to the user which allows them to edit the payment attributes associated with the record A. Again, the user's details 306 are displayed. In addition, a table is displayed indicating the payment card 308 of the record concerned, merchant ID 301, time period constraint 302, and payment amount constraint 303. The merchant ID 301 is a non-editable payment attribute in this example. That is, the record cannot be edited to change the merchant ID. However, the time period constraint 302 and payment amount 303 can be edited.

The time period constraint 302 may be specified by a first date 309 (indicating a date before which CPA payments will not be accepted) and a second date 311 (after which CPA payments will not be accepted). In this case, a date 309 is set but a date 311 is not set. The time period constraint 302 is thus set to "not before 1 Oct. 2018", as previously discussed. Similarly, a first time 310 (before which a CPA payment is not accepted) and a second time 312 (after which a CPA payment is not accepted) may be specified. In this case, neither of the times 310 or 312 are defined, meaning that a default time of midnight on 1 Oct. 2018 is set (as previously discussed).

Regarding the payment amount constraint 303, a first payment amount 313 (above which a CPA payment is rejected) and a second payment 314 (below which a CPA payment instruction is rejected) are defined. In this case, it can be seen that the first payment amount 313 has been set at £500, whereas no value has been defined for the second payment amount 314. This results in the payment amount constraint of "not more than £500" for this record, as previously discussed. The user is able to edit each of the date information 309 and 311, time information 310 and 312 and payment information 313 and 314 by selecting an appropriate one of the boxes of the displayed table 307 and entering numerical values using a suitable user interface (not shown). For example, the user may enter numeral date, time, and payment amount information using a keyboard (e.g., on-screen keyboard used with a touch interface of the display or a physical keyboard), scrolling interface or the like.

After the user has chosen values for defining the time period constraint 302 and payment amount constraint 303, they may confirm any changes they have made by selecting the "confirm" button 316. This saves the changes to the record in the first database. Alternatively, the user may select the "delete" button 315. This deletes the CPA restriction defined for the record A in the first database. In this case, the record is removed from the first database and a CPA transaction instructed by Merchant 1 using the credit card details stored as part of (now deleted) record A will be accepted. A user may also be given, for example, the option for records associated with the payment card concerned and merchant concerned to not be added to the first database in the future. Such an option may be provided as part of an opt out service or the like provided to the user via the account management portal provided by the issuer. In this case, it may be the case that a further database (e.g., stored in the first storage medium 103) is used to record details of the payment card and the merchant ID stored as part of record A. This additional database may act as a "safe list" which prevents CPA payments instructed using the payment card details and merchant identifier of record A from being added to the first database. Alternatively, the user selecting the "delete" button 315 may automatically populate the time period constraint field 309 with a date which has already passed and the payment constraint field 313 with an amount higher than it is possible for the user to spend in a single transaction (e.g., based on a user's credit limit or bank account balance, for example). Such constraints could be automatically populated based on values determined by the issuer, for example. This would have the effect of deleting the CPA restriction for the payment card and merchant combination. In the case that a record is deleted (whether truly deleted or whether effectively deleted through the use of payment attributes which will never be met), the deleted record may be removed from the records shown to the user on an electronic screen. This saves screen space on the device used by the user to access their account management portal and provides the user only with the CPA restrictions which they are most likely to be interested in. Alternatively, all records (whether truly deleted and added to a "safe list" in another database or effectively deleted through the use of payment attributes which will never be met) may continue to be shown on the electronic screen so as to enable a user to see all CPA transactions and any restrictions associated with them. In this case, CPA transactions with no restrictions could be provided with a label (not shown) in the displayed table informing the user that no restrictions are in place for that CPA transaction, for example.

FIGS. 3E and 3F show, respectively, the records of the first database shown in FIG. 3A as viewable by an acquirer and by a merchant. In this case the acquirer is "Acquirer 1", and it can therefore be seen that records A, B, C, and E are viewable by the acquirer (since these are the records for CPA restrictions associated with merchants serviced by Acquirer 1. Again, a table of the form as shown in FIG. 3E may be accessed by an acquirer who has signed up to use the CPA management service provided by the data processing apparatus 100. The information may be viewed in a tabular form, for example, using an electronic display to display a table like that shown in FIG. 3E to an employee of the acquirer so as to enable the acquirer to monitor CPA restrictions implemented for transactions involving merchants working with the acquirer. In this case, the acquirer is only able to see the records associated with merchants serviced by that acquirer. It is also noted that there is no "edit" option in FIG. 3E. That is, the acquirer has no ability to remove or edit CPA restrictions recorded in the first database. Rather, it may only view records associated with merchants working with that acquirer.

Similarly, a merchant may view records of CPA restrictions stored in the first database relating to CPA payments initiated by that merchant. This is shown in FIG. 3F, which shows the records of the first database viewable by the merchant with merchant ID "Merchant 1". In this case, the merchant is able to view the card holder ID associated with each CPA restriction, together with the optional attributes of time period constraint and payment amount constraint. Again, the information shown in FIG. 3F may be presented to e.g., an employee of the merchant using an electronic display in a similar form to that shown in FIG. 3F (e.g., a tabular form). The merchant is therefore able to review cardholders (these being customers) who have implemented restrictions on CPA payments to that merchant, thus providing the merchant with better visibility of their customer's CPA preferences. Again, the merchant is not able to edit any of the CPA restriction records. Rather, it may only view CPA restriction records associated with it (that is, it cannot see CPA restriction records for other merchants). A table like that shown in FIG. 3F may be displayed on an electronic display used by the merchant in accessing records of the first database.

It would be appreciated that the merchant 201 and or acquirer 202 may be provided with access to a portal or the like in order to access the records associated with that acquirer and/or merchant. In either case, the merchant and/or acquirer must supply relevant credentials (such as a username and password or the like) in order to log in to the portal and review CPA restriction data associated with that merchant and/or acquirer. This helps ensure that CPA restriction data may only be viewed by authorized parties.

As previously mentioned, as well as the first storage medium 103 storing the first database (which may be referred to as a restriction database), the second storage medium 104 is configured to store a second database relating data indicative of each instructed payment and data indicative of whether the instructed payment was accepted or rejected. An example of such a second database (which may be referred to as a transaction database) is shown in FIG. 4A. It is noted that, although the first and second storage mediums 103 and 104 are shown as separate storage mediums, the first and second storage mediums may be the same storage medium.

As can be seen in FIG. 4A, a number of records are stored in the transaction database of the second storage medium 104. In this example, one transaction is shown for each of the records in the CPA restrictions database. This is for illustrative purposes, and it will be appreciated that, in reality, each record in the CPA restrictions database may be associated with more than one record in the transaction database. In the example of FIG. 4A, each of the transaction records A' to F' relates, respectively, to a record A to F in the restriction database (see FIG. 3A). Each record of the transaction database includes the cardholder ID 300 indicating details of the payment card (and thus the cardholder of the payment card) with which the CPA transaction was attempted, a merchant ID 301 indicative of the merchant at which the CPA transaction was attempted, a transaction date and time 400 indicating the date and time at which the CPA payment instruction was issued by the merchant, a transaction amount 401 indicating the monetary amount of the attempted CPA transaction, and data 402 indicative of whether the CPA transaction was declined or approved.

For the sake of explanation, each of the records in the transaction database shown in FIG. 4A corresponds to a respective record of the restrictions database. In particular, transaction A' relates to a CPA transaction initiated using the electronic payment card details recorded in record A of the restrictions database. Similarly, transaction B' relates to a CPA transaction initiated using the electronic payment card details recorded in record B of the restrictions database, and so on. It can therefore be easily seen why each of the CPA transactions stored in the transactions database was declined or approved.

More specifically, looking at the record A', it is shown that the payment details of record A of the restrictions database were used by Merchant 1 to initiate a CPA transaction on 17 Sep. 2017 at 13:14. The amount was for £398.35. In this case, because the transaction date and time was before 1 Oct. 2018, the CPA payment was declined.

Regarding transaction B', this was instructed using the payment card details of record B of the restrictions database. The merchant which initiated the CPA transaction was Merchant 1. The transaction date and time was 18 Mar. 2018 at 21:02 and the transaction amount was £201.50. Again, the CPA transaction was declined. In this case, it would not have mattered if the CPA transaction had been attempted at a different date or time or with a different transaction amount because no time period constraint or payment amount constraint has been specified as a payment attribute for the record B in the restrictions database.

Looking at record C' of the transaction database, this was initiated by Merchant 2 using the payment card details stored in record C of the restrictions database. In this case, the payment attributes stored in the restrictions database for this record include the time period constraint of "not before 1 Jun. 2018 at 13:00 hours". There is no payment amount constraint for this CPA restriction record. The attempted CPA transaction as shown in the transaction database table of FIG. 4A shows that the transaction date and time was 29 May 2018 at 13:50. This was before 1 Jun. 2018 at 13:00 hours, and therefore the transaction was declined.

It can be seen that approve/decline results of the further transaction records reflect the restrictions provided for CPA payments in the restrictions database. In particular, transaction D' was declined because the restriction record D prevents all CP transactions using the payment card details of restriction record D initiated using Merchant 3. On the other hand, the transaction E' was approved because neither the time period constraint nor the payment amount constraint was met. The transaction therefore had none of the payment attributes necessary for the CPA transaction to be blocked. Finally, the transaction F' was declined because, even though there was no time period constraint, there was a payment amount constraint of "not more than £350" and the requested transaction amount for the CPA transaction had this attribute (that is, it was £371.18, which is more than £350).

It will thus be appreciated that a database of attempted CPA transactions may be built up as CPA transactions using payment card details stored in the restrictions database are initiated by merchants. Those CPA transactions may or may not be successful depending on whether a predetermined one or more of the payment attributes stored in the restrictions database for a particular payment card (or payment card and merchant combination) have been met.

As with the restrictions database stored in the first storage medium 103, the transaction database stored in the second storage medium 104 may be accessed by one or more of the issuer 204, merchant 201, and acquirer 202. In each case, each of these parties is able to access records of a transaction database which are relevant for that party but not records which are not relevant to that party.

FIG. 4B shows a subset of the records of the transaction database relevant to the first issuer ("Issuer 1"). Again, the issuer may access the transaction database using a suitable portal or the like which the issuer (e.g., an employee of the issuer) must log in to using suitable credentials (e.g., user name and password or the like). In this case, the issuer is "Issuer 1" and therefore the issuer is able to see transaction database records for CPA transactions instructed using payment cards issued by that issuer (but not those of payment cards issued by other issuers). As well as the cardholder ID 300, merchant ID 301, transaction date and time 400, transaction amount 401, and data 402 indicating whether or not a particular CPA transaction has been approved or declined, a further column 403 is shown in FIG. 4B. This "Details?" column includes a number of "Details" buttons 404 which an employee of the issuer may select when records of the transaction database like those shown in FIG. 4B are displayed on an electronic display of the issuer. The issuer may access the transaction database records applicable to the issuer using a computer, tablet computer or the like capable of displaying data in a tabular format like that shown in FIG. 4B, for example. When one of the "details" buttons 404 is selected (again, using a touch panel of the electronic display or a moveable cursor or the like), the relevant details in the restrictions database may be obtained and displayed. For example, in the case that the "details" button 404 for the transaction record A' is selected, the record for the payment card details used for that CPA transaction as stored in the restrictions database may be obtained and displayed. In this case, the details displayed would be the details of the record A shown in FIG. 3B, for example.

Thus, the issuer is able to see whether a particular CPA transaction has been approved or declined. By pressing the "details" button for a particular transaction record of interest, it can then be determined why that particular transaction was approved or declined. For example, in the case of the transaction A', when a user (e.g., employee of the issuer) selects the "details" button 404 for this record, the user will be presented with information obtained from record A of the restrictions database showing the payment attributes of CPA transactions which are to be rejected by the data processing apparatus 100. For example, in this case, the user will be able to learn that the transaction A' was rejected because the time period constraint was met (17 Sep. 2017 is before 1 Oct. 2018 and therefore the time period constraint is met, thus resulting in the CPA transaction being rejected).

As with the restrictions database, relevant records of the transactions database maybe brought up and displayed to an individual customer of the issuer, an acquirer, and a merchant.

FIG. 4C shows transaction records obtained from the transactions database on behalf of the same customer discussed with reference to FIGS. 3C and 3D. In this case, the customer may view records of the transactions database via an account management portal provided by the issuer or the like. The customer accessing the transaction database in this way is presented with a subset of records of the transaction database relevant to that customer (again, in this case, details relating to both a credit card and debit card issued by the issuer to the customer). The customer is therefore able to review CPA transactions which have been attempted and the outcome of those transactions (i.e., whether they were approved or declined). Again, by the user pressing the "details" button 404 for a particular transaction, corresponding data for the particular payment card concerned from the restrictions database may be obtained. Thus, for example, if the user were to select the "details" button 404 for the transaction A', details of the restriction record A (see FIG. 3C) may be presented to the user. The user is thus able to see immediately why a particular transaction was declined and, may even then edit the CPA restriction record in order to change the outcome of a further CPA transaction attempted for that payment card by that merchant in the future. For example, in the case of transaction A', the CPA transaction was declined because the time period constraint was met. The user may therefore edit the CPA restriction record A (using the method described with reference to FIG. 3D, for example) to bring it forward (i.e., to a date in the past) such that a subsequent attempt at instructing the CPA transaction is successful.

FIGS. 4D and 4E show, respectively, records of the transaction database which are viewable by an acquirer and a merchant.

In example of FIG. 4D, the transaction database records accessible to "Acquirer 1" are shown. In this case only transaction records for CPA transactions initiated by merchants affiliated with the acquirer are accessible to the acquirer. In the case that the "details" button 404 is selected for a particular record, the details of the corresponding CPA restriction record (as shown in FIG. 3E, for example) may be displayed.

In the example of FIG. 4E, a merchant is able to view the transaction database records for transactions initiated by that merchant only. The merchant may again select the "details" button 404 of an appropriate record so as to enable a CPA restriction record corresponding to that transaction (as shown in FIG. 3F, for example) to be displayed. In the example of FIG. 4E, the merchant is "Merchant 1".

It will thus be appreciated that, in an embodiment of the present technique, CPA transactions may be easily and securely reviewed and managed by a number of different parties involved in processing of CPA transactions. A cardholder is given improved control over their CPA transactions and is able to easily prevent CPA transactions from occurring or to set appropriate limits (e.g., in terms of payment date and time and/or payment amount) for future CPA transactions. The cardholder is also able to see and review CPA transactions which they might otherwise forget about (thereby helping to prevent a user from experiencing unexpected deductions from their bank or credit account due to forgotten CPA transactions). Furthermore, other parties such as merchants, acquirers, and issuers are provided with opportunities to view CPA transaction data relevant to those parties. At the same time, CPA transaction and restriction data not relevant to those parties cannot be seen by those parties. Only a cardholder (and perhaps an issuer) are furthermore able to edit or change the CPA restriction data stored in the storage medium 103, thus providing further improved control and security to cardholders. Thus, with the present technique, the data processing apparatus 100 allows data indicative of a user and data indicative of an instruction associated with the user to be managed effectively.

In the embodiments of FIGS. 4B to 4E, it was mentioned that a user selecting the "Details" button 404 of a particular record of the transaction database leads to the appropriate record in the restrictions database being displayed. However, it will be appreciated that the restrictions in place for a particular CPA payment when the acceptance/rejection of a CPA transaction is reviewed by selecting the "Details" button 404 may be different to the restrictions which were in place at the time that the CPA payment was accepted/rejected. Thus, in an alternative embodiment, each record in the restrictions database is provided with a validity period defining a temporal validity for which the restrictions associated with that record are valid. That record is then only referred to for newly received transactions during its validity period. After the validity period has expired, that record is not referred to for newly received transactions. However, when the "Details" button 404 for a particular transaction is selected (e.g., using the user interface described with reference to one of FIGS. 4B to 4E), an expired record may be referred to if the date and time of that transaction was within the validity period of that record. This allows a user to see the restrictions that were in place at a time that a particular transaction was attempted, rather than the current restrictions (which may not have been in place when the particular transaction was attempted). This helps to provide the user with the most relevant data for each transaction. The validity period of each restriction record may be displayed to a user in one or more additional fields in the tables shown in FIGS. 3B to 3F, for example.

In the above-mentioned embodiments, the CPA restrictions in the restrictions database (shown e.g., in FIG. 3A) are applied on the basis of a payment card and merchant combination. However, it will be appreciated that CPAs may be restricted on a payment card basis only. In this case, a record in the restrictions database may include only the details of the payment card for which CPAs are to be restricted. In this case, any transaction flagged as a CPA transaction will be declined by the data processing apparatus 100 when the details of the payment card concerned are used, no matter who the merchant is.

In embodiments, the cardholder ID 300 is defined, for simplicity, to be the PAN number of an electronic payment card only. However, it will be appreciated that other necessary details of the payment card may also be stored as part of the cardholder ID so as to enable CPA payments which are permitted to be conducted without requiring further input from the user to be carried out.

In embodiments, in order to allow various different parties suitable access to the restrictions database and/or transactions database of the database processing apparatus 100, interested parties may register with the service provider providing the data processing apparatus 100 (for example, the card scheme 203 providing the CPA restriction service) and, upon registration, may be provided with a suitable application programming interface (API) which may then be used to build a suitable computer program for accessing CPA restriction database and CPA transaction database records. This allows, for example, issuers to provide information from the restrictions database and transactions database to customers of that issuer using account management portals, websites, or software applications that customers of that issuer are already familiar with. It is therefore envisaged, for example, that a user may be able to view CPA restrictions in the way as described along with other recurring payment options such as standing orders or direct debits. The user would thus be provided with an integrated, all-in-one system for managing various types of recurring payments including CPA payments.

It is envisaged that the present technique could also be implemented in combination with a system such as Automatic Billing Updater (ABU) provided by MasterCard®. Such an arrangement allows acquirers and/or merchants signed up to the ABU service to automatically receive new payment card information from an issuer when a customer of that issuer is issued with a new payment card (for example, following the expiry of a previous card or following the cancellation and replacement of a previous card which is lost or stolen). Such an arrangement means that recurring payments such as CPAs are not interrupted when the card details of a particular user are changed. In this case, by integrating the present technique with such ABU technology, CPA restrictions for a particular card may be automatically applied to the details of a new card for that user. In this case, the data processing apparatus 100 may be controlled to generate a new restrictions database record for the new card. Alternatively, the previous restrictions database record may be maintained, but the cardholder ID may be updated so that the restrictions database record then includes the details of the new payment card.

Although the above-mentioned embodiments relate largely to management of CPA payments, it will be appreciated that the present technique is not limited to such an application. Rather, it will be appreciated that the technical solution provided by the present technique may be applied in order to help efficiently manage any kind of data indicative of a user and data indicative of an instruction associated with the user which is generated in the absence of an explicit command from that user using previously obtained data indicative of the user and data indicative of an instruction associated with the user.

Figure 5:
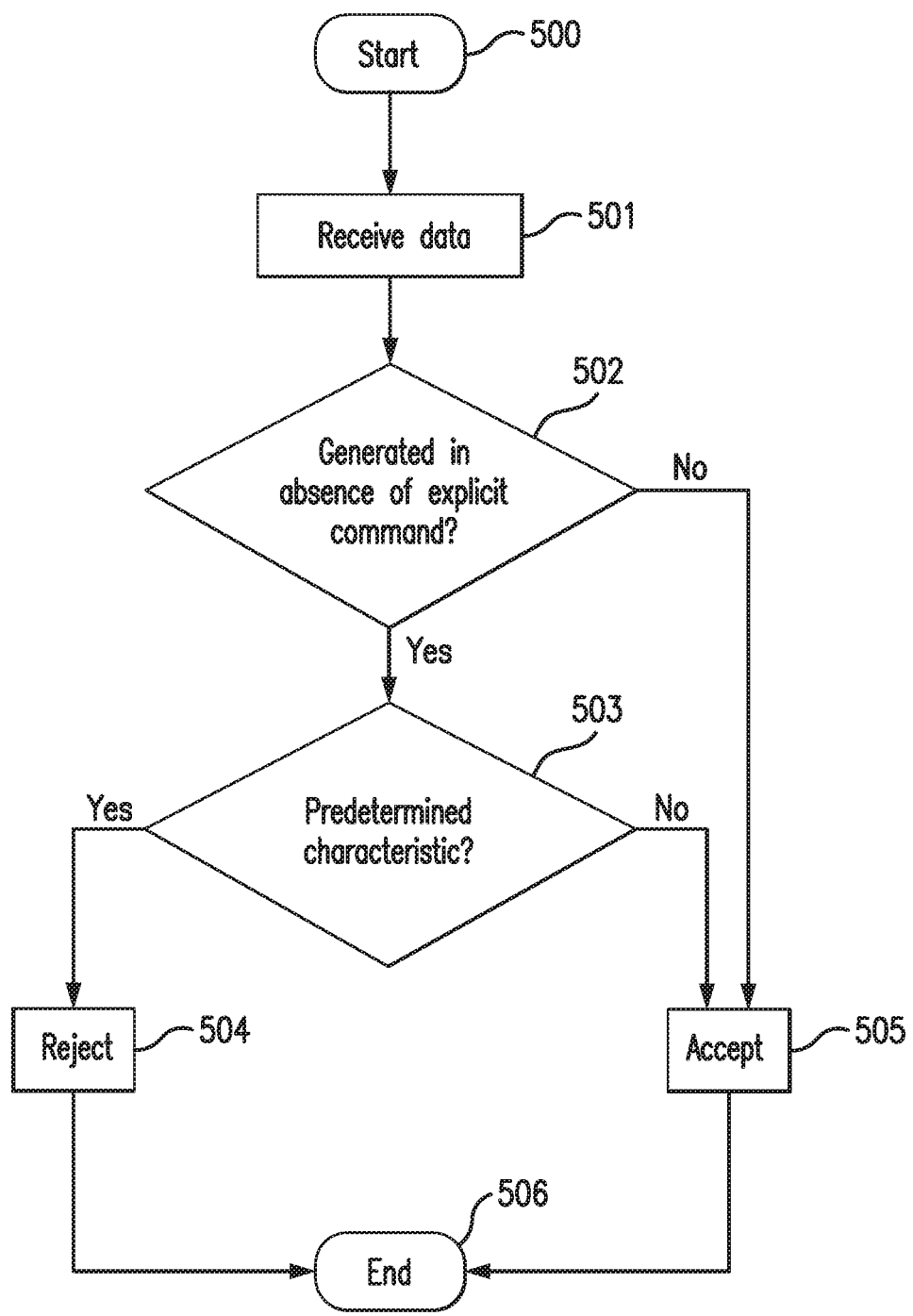
FIG. 5 schematically shows a method (or process) of operating a data processing apparatus according to an embodiment.

FIG. 5 schematically shows a method (or process) of operating the data processing apparatus 100 according to an embodiment of the present technique. The method starts at step 500. At step 501, the communication interface 101 is controlled to receive data indicative of a user and data indicative of an instruction associated with the user. At step 502, it is determined whether the received data indicative of the user and data indicative of the instruction associated with the user have been generated in the absence of an explicit command from the user using previously obtained data indicative of the user and data indicative of an instruction associated with the user. If it is determined that the received data indicative of the user and data indicative of the instruction associated with the user have not been generated in the absence of an explicit command from the user using previously obtained data indicative of the user and data indicative of an instruction associated with the user, then the process proceeds to step 505, at which processing is executed to accept the instruction associated with the user as indicated by the received data. The process then ends at step 506. On the other hand, if it is determined that the received data indicative of the user and data indicative of the instruction associated with the user have been generated in the absence of an explicit command from the user using previously obtained data indicative of the user and data indicative of an instruction associated with the user, then the process proceeds to step 503. At step 503, it is determined whether the received data indicative of the user and data indicative of the instruction associated with the user include a predetermined characteristic. If the received data indicative of the user and data indicative of the instruction associated with the user include the predetermined characteristic, then the method proceeds to step 504, at which processing is executed to reject the instruction associated with the user as indicated by the received data. The process then ends at step 506. On the other hand, if the received data indicative of the user and data indicative of the instruction associated with the user do not include the predetermined characteristic, then the method proceeds to step 505, at which processing is executed to accept the instruction associated with the user as indicated by the received data. The process then ends at step 506.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory, or the like, is also considered to represent an embodiment of the present disclosure.

It will be appreciated that the above description for clarity has described embodiments with reference to different functional units, circuitry, and/or processors. However, it will be apparent that any suitable distribution of functionality between different functional units, circuitry, and/or processors may be used without detracting from the embodiments.

Described embodiments may be implemented in any suitable form including hardware, software, firmware, or any combination of these. Described embodiments may optionally be implemented at least partly as computer software running on one or more data processors and/or digital signal processors. The elements and components of any embodiment may be physically, functionally, and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry, and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

What is claimed is:

1. A data processing apparatus arranged between and communicatively coupled between a merchant computing device and an issuer computing device in an electronic payment processing system, the data processing apparatus comprising:
communication circuitry configured to:
store data in and retrieve data from a first storage medium configured to store a first database; and
receive an electronic data message originating from a remote computing device, wherein the electronic data message is a transaction authorization request including first data elements including data indicative of a user and second data elements including data indicative of an instruction associated with the user, and wherein the electronic data message includes a predetermined indicator; and
control circuitry configured to:
instruct the communication circuitry to store within the first database data including a user-instructed recurring payment and attributes associated with the recurring payment, the attributes input by the user and including both a time period constraint and a payment amount constraint on the recurring payment associated with the user;
upon receiving, by the communication circuitry, the electronic data message, determine whether the received electronic data message including the first data elements, the second data elements, and the predetermined indicator is a recurring payment authorization request message associated with the user-instructed recurring payment that was generated by the merchant computing device using data obtained from the user during an initial payment transaction initiated with the merchant computing device responsive to an instruction from the user for the recurring payment;

when it is determined that the received electronic data message is the recurring payment authorization request message, perform an operation comprising:

determine that the first data elements or the second data elements include attribute data elements for comparison to the data stored within the first database including the attributes associated with the user;

instruct the communication circuitry to retrieve the data stored within the first database including the attributes associated with the user; and compare the attribute data elements to both the time period constraint and the payment amount constraint of the attributes;

when the attribute data elements of the recurring payment authorization request message satisfy at least one of the time period constraint and the payment amount constraint, execute processing, by the control circuitry, to decline the recurring payment authorization request message;

when the attribute data elements of the recurring payment authorization request message do not satisfy either of the time period constraint and the payment amount constraint, execute processing, by the control circuitry, to transmit the recurring payment authorization request message to the issuer computing device for authorization of the recurring payment;

store within a second database data indicative of a decision to authorize or decline the recurring payment authorization request message, the decision made based on comparing the attribute data elements to both the time period constraint and the payment amount constraint;

display, to the user via an account management portal, a transaction record report that includes i) the attribute data elements from the recurring payment authorization request message, ii) the data indicative of the decision to authorize or decline the recurring payment authorization request message, and iii) a first user interface button;

display, via the account management portal, in response to a first user input made on the first user interface button, a restriction record that includes the time period constraint and the payment amount constraint that were compared to the attribute data elements from the recurring payment authorization request message and a second user interface button; and modify, in response to a second user input made on the second user interface button, at least one of the time period constraint and the payment amount constraint stored in the first database.

2. The data processing apparatus according to claim 1, wherein the control circuitry is configured to determine that the received electronic data message is the recurring payment authorization request message by detecting that the received electronic data message includes the predetermined indicator.

3. The data processing apparatus according to claim 2, wherein the first data elements include payment card data of an electronic payment card held by the user.

4. The data processing apparatus according to claim 3, wherein a record relating to the data indicative of the user and data indicative of the attributes is accessible to at least one of an issuer of the electronic payment card held by the user, a merchant identified by the data indicative of the at least one payment attribute, and an electronic payment card acquirer associated with a merchant identified by the data indicative of the at least one payment attribute.

5. The data processing apparatus according to claim 3, wherein the second database is accessible to at least one of an issuer of the electronic payment card used for instructing the recurring payment authorization request message, a merchant associated with the instructed recurring payment authorization request message, and an electronic payment card acquirer of the merchant associated with the instructed recurring payment authorization request message.

6. The data processing apparatus according to claim 2, wherein the predetermined indicator is a flag indicating that the transaction authorization request is associated with a recurring payment.

7. The data processing apparatus according to claim 1, wherein:

the communication circuitry is configured to receive the electronic data message from an electronic payment card acquirer associated with the merchant computing device; and the processing to decline the transaction authorization request comprises controlling the communication circuitry to transmit an electronic response message back to the electronic payment card acquirer indicating that the transaction authorization request has been declined.

8. The data processing apparatus according to claim 1, wherein the control circuitry is further configured to control the communication circuitry to receive the attributes from a user computing device associated with the user.

9. The data processing apparatus according to claim 1, wherein the transaction record report is displayed to the user in a table in a tabular format, wherein the table includes each recurring payment transaction of a plurality of recurring payment transactions of the user and further includes a user selectable button for each recurring payment transaction, and wherein the user selectable button is configured to cause additional details describing the associated recurring payment transaction to be displayed when selected by the user.

10. The data processing apparatus according to claim 9, wherein the user selectable button, when selected, causes the time period constraint and the payment amount constraint for the associated recurring payment transaction to be displayed, and enables the user to modify the time period constraint and the payment amount constraint from this display.

11. A method of operating a data processing apparatus, the data processing apparatus arranged between and communicatively coupled between a merchant computing device and an issuer computing device in an electronic payment processing system, the data processing apparatus including communication circuitry and control circuitry, wherein the method comprises:

controlling, by the control circuitry, the communication circuitry to:

store data in and retrieve data from a first storage medium configured to store a first database; and receive an electronic data message originating from a remote computing device, wherein the electronic data message is a transaction authorization request including first data elements including data indicative of a user and second data elements including data indicative of an instruction associated with the user, and wherein the electronic data message includes a predetermined indicator;

instructing, by the control circuitry, the communication circuitry to store within the first database data including a user-instructed recurring payment and attributes associated with the recurring payment, the attributes input by the user and including both a time period constraint and a payment amount constraint on the recurring payment associated with the user;

upon receiving, by the communication circuitry, the electronic data message, determining, by the control circuitry, whether the received electronic data message including the first data elements, the second data elements, and the predetermined indicator is a recurring payment authorization request message associated with the user-instructed recurring payment that was generated by the merchant computing device using data obtained from the user during an initial payment transaction initiated with the merchant computing device responsive to an instruction from the user for the recurring payment;

when it is determined that the received electronic data message is the recurring payment authorization request message, performing further steps comprising:

determining, by the control circuitry, that the first data elements or the second data elements include attribute data elements for comparison to the data stored within the first database including the attributes associated with the user;

instructing, by the control circuitry, the communication circuitry to retrieve the data stored within the first database including the attributes associated with the user;

comparing, by the control circuitry, the attribute data elements to both the time period constraint and the payment amount constraint of the attributes;

when the attribute data elements of the recurring payment authorization request message satisfy at least one of the time period constraint and the payment amount constraint, executing processing, by the control circuitry to decline the recurring payment authorization request message; and when the attribute data elements of the recurring payment authorization request message do not satisfy either of the time period constraint and the payment amount constraint, executing processing, by the control circuitry, to transmit the recurring payment authorization request message to the issuer computing device for authorization of the recurring payment;

storing within a second database data indicative of a decision to authorize or decline the recurring payment authorization request message, the decision made based on comparing the attribute data elements to both the time period constraint and the payment amount constraint;

displaying, to the user via an account management portal, a transaction record report that includes i) the attribute data elements from the recurring payment authorization request message, ii) the data indicative of the decision to authorize or decline the recurring payment authorization request message, and iii) a first user interface button;

displaying, via the account management portal, in response to a first user input made on the first user interface button, a restriction record that includes the time period constraint and the payment amount constraint that were compared to the attribute data elements from the recurring payment authorization request message and a second user interface button; and modifying, in response to a second user input made on the second user interface button, at least one of the time period constraint and the payment amount constraint stored in the first database.

12. The method according to claim 11, determining whether the received electronic data message is a recurring payment authorization request message comprises determining the received electronic data message includes a predetermined indicator.

13. The method according to claim 12, wherein the first data elements include payment card data of an electronic payment card held by the user.

14. The method according to claim 13, wherein a record relating to the data indicative of the user and data indicative of the attributes is accessible to at least one of an issuer of the electronic payment card held by the user, a merchant identified by the data indicative of the at least one payment attribute, and an electronic payment card acquirer associated with a merchant identified by the data indicative of the at least one payment attribute.

15. The method according to claim 13, wherein the second database is accessible to at least one of an issuer of the electronic payment card used for instructing the recurring payment authorization request message, a merchant associated with the instructed recurring payment authorization request message, and an electronic payment card acquirer of the merchant associated with the instructed recurring payment authorization request message.

16. The method according to claim 12, wherein the predetermined indicator is a flag indicating that the transaction authorization request is associated with a recurring payment.

17. The method according to claim 11,
wherein controlling the communication circuitry to receive the electronic data message comprises controlling the communication circuitry to receive the electronic data message from an electronic payment card acquirer associated with the merchant computing device; and
wherein executing processing to decline the transaction authorization request comprises controlling the communication circuitry to transmit an electronic response message back to the electronic payment card acquirer indicating that the transaction authorization request has been declined.

18. A non-transitory storage medium storing computer-executable instructions that, when executed by at least one processor of a data processing apparatus, cause the at least one processor to execute processing to:
store data in and retrieve data from a first storage medium configured to store a first database;
receive an electronic data message originating from a remote computing device, wherein the electronic data message is a transaction authorization request including first data elements including data indicative of a user and second data elements including data indicative of an instruction associated with the user, and wherein the electronic data message includes a predetermined indicator;

store within the first database data including a user-instructed recurring payment and attributes associated with the recurring payment, the attributes input by the user and including both a time period constraint and a payment amount constraint on the recurring payment associated with the user;

upon receiving the electronic data message, determine whether the received electronic data message including the first data elements, the second data elements, and the predetermined indicator is a recurring payment authorization request message associated with the user-instructed recurring payment that was generated by a merchant computing device using data obtained from the user during an initial payment transaction initiated with the merchant computing device responsive to an instruction from the user for the recurring payment using previously obtained data indicative of the user and data indicative of an instruction associated with the user;

when it is determined that the received electronic data message is the recurring payment authorization request message, perform an operation comprising:

determine that the first data elements or the second data elements include attribute data elements for comparison to the data stored within the first database including the attributes associated with the user;

retrieve the data stored within the first database including the attributes associated with the user; and compare the attribute data elements to both the time period constraint and the payment amount constraint of the attributes;

when the attribute data elements of the recurring payment authorization request message satisfy at least one of the time period constraint and the payment amount constraint, execute processing to decline the recurring payment authorization request message; and when the attribute data elements of the recurring payment authorization request message do not satisfy either of the time period constraint and the payment amount constraint, execute processing to transmit the recurring payment authorization request message to an issuer computing device for authorization of the recurring payment;

store within a second database data indicative of a decision to authorize or decline the recurring payment authorization request message, the decision made based on comparing the attribute data elements to both the time period constraint and the payment amount constraint;

display, to the user via an account management portal, a transaction record that includes i) the attribute data elements from the recurring payment authorization request message, ii) the data indicative of the decision to authorize or decline the recurring payment authorization request message, and iii) a first user interface button;

display, via the account management portal, in response to a first user input made on the first user interface button, a restriction record that includes the time period constraint and the payment amount constraint that were compared to the attribute data elements from the recurring payment authorization request message and a second user interface button; and modify, in response to a second user input made on the second user interface button, at least one of the time period constraint and the payment amount constraint stored in the first database.

\* \* \* \* \*